United States Patent
Colignon

(10) Patent No.: US 7,320,215 B2
(45) Date of Patent: Jan. 22, 2008

(54) SYSTEM FOR PROVIDING ASSISTANCE IN REGENERATING DEPOLLUTION MEANS INTEGRATED IN A VEHICLE EXHAUST LINE

(75) Inventor: Christophe Colignon, Levallois Perret (FR)

(73) Assignee: Peugeot Ciitroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/595,632

(22) PCT Filed: Oct. 12, 2004

(86) PCT No.: PCT/FR2004/002588

§ 371 (c)(1),
(2), (4) Date: May 1, 2006

(87) PCT Pub. No.: WO2005/047676

PCT Pub. Date: May 26, 2005

(65) Prior Publication Data

US 2007/0107418 A1 May 17, 2007

(30) Foreign Application Priority Data

Nov. 7, 2003 (FR) .................................. 03 13159

(51) Int. Cl.
*F01N 3/00* (2006.01)
(52) U.S. Cl. ............................. 60/295; 60/285; 60/286; 60/297
(58) Field of Classification Search .................. 60/280, 60/284, 285, 286, 295, 297, 311
See application file for complete search history.

(56) References Cited

U.S. PATENT DOCUMENTS

| 6,508,057 | B1 | 1/2003 | Gil et al. |
| 6,594,990 | B2 | 7/2003 | Sayed et al. |
| 6,622,480 | B2 * | 9/2003 | Tashiro et al. ................. 60/295 |
| 6,662,553 | B2 * | 12/2003 | Patchett et al. ............... 60/286 |
| 6,666,020 | B2 * | 12/2003 | Tonetti et al. ................. 60/286 |
| 6,952,918 | B2 * | 10/2005 | Imai et al. ..................... 60/295 |
| 6,966,179 | B2 * | 11/2005 | Onodera et al. .............. 60/295 |
| 7,007,458 | B2 * | 3/2006 | Mazur et al. ................. 60/277 |

FOREIGN PATENT DOCUMENTS

| DE | 10033159 A | 1/2002 |
| DE | 10056016 A | 5/2002 |
| EP | 1130227 A | 9/2001 |
| EP | 1174612 A | 1/2002 |
| EP | 1281852 A | 2/2003 |

* cited by examiner

Primary Examiner—Binh Q. Tran
(74) Attorney, Agent, or Firm—Nicolas E. Seckel

(57) ABSTRACT

The system for assisting the regeneration of depollution means (4) associated with oxidation catalyst-forming means (3) integrated in an exhaust line (2) of a motor vehicle diesel engine (1) in which the engine (1) is associated with common manifold means (5) for feeding fuel to its cylinders, the system being adapted implement, at constant torque, a strategy of regeneration by injecting fuel into the cylinders of the engine in at least one post-injection, is characterized in that it includes means (7, 8, 9) for detecting a stage in which the vehicle engine is idling or in which the accelerator pedal is being raised, and means (6) for analyzing the activity state of the catalyst-forming means (3) in order to control the common fuel-feed manifold means (5) in order to regulate the quantity of fuel injected during the or each post-injection as a function of the activity state of the catalyst-forming means (3).

11 Claims, 2 Drawing Sheets

SYSTEM FOR PROVIDING ASSISTANCE IN REGENERATING DEPOLLUTION MEANS INTEGRATED IN A VEHICLE EXHAUST LINE

The present invention relates to a system for providing assistance in regenerating depollution means associated with oxidation catalyst-forming means that are integrated in an exhaust line of a motor vehicle diesel engine.

More particularly, the invention relates to such engines associated with common manifold means for feeding the cylinders of the engine with fuel, said means being adapted to implement, at constant torque, a strategy of regeneration by injecting fuel into the cylinders of the engine in at least one post-injection.

In the prior art, it is known to regenerate depollution means by using one or more post-injections of fuel into the cylinders of the engine, i.e. one or more operations of injecting fuel during the expansion stage in a cylinder.

Nevertheless, while regenerating depollution means that include a particle filter, for example, the temperature of the exhaust gas is very low during stages in which the engine is idling, and during stages in which the vehicle accelerator pedal is being raised, i.e. during stages in which no fuel is injected in normal operation, and these stages are problematic since they cause a temperature drop both in the exhaust line and also in the various means integrated therein.

The use of one or more post-injections during these stages in the operation of the engine then serves to limit the temperature drop in the exhaust line by relying on catalytic conversion of the hydrocarbons (HCs) produced by the combustion of said post-injected fuel in the engine.

The drawback of those strategies is that they rely on the exothermic reaction produced by the oxidation catalyst-forming means, which means are formed by an oxidation catalyst or a NOx trap having a CO/HC oxidation function, for example, said catalyst-forming means then being considered as being activated.

During stages it which the engine is returning to idling, there is no main injection of fuel nor any pilot injection, such that any post-injected fuel does not burn in the cylinder. The fuel is then merely vaporized in the form of HCs that are subsequently converted by the catalyst-forming means. The temperature at the inlet to the oxidation catalyst-forming means is then very low, and in spite of the catalytic reaction produced by the combustion of the HCs coming from the post-injected fuel being exothermic, the front face of the catalyst-forming means cools down progressively and its conversion activity dies down progressively. During a prolonged stage in which the engine is returning to idling, it can then happen that the catalyst-farming means are not sufficiently active to convert all of the HCs, thereby leading to peaks of HC downstream from the catalyst-forming means, or even to blue smoke and/or exhaust odors.

The object of the invention is thus to solve those problems.

To this end, the invention provides a system for assisting the regeneration of depollution means associated with oxidation catalyst-forming means integrated in an exhaust line of a motor vehicle diesel engine, and in which the engine is associated with common manifold means for feeding fuel to its cylinders, the system being adapted to implement, at constant torque, a strategy of regeneration by injecting fuel into the cylinders of the engine in at least one post-injection, the system being characterized in that it includes detection means for detecting a stage in which the vehicle engine is idling and/or in which the accelerator pedal is being raised, and analysis means for analyzing the activity state of the catalyst-forming means in order to control the common fuel-feed manifold means in order to regulate the quantity of fuel injected during the or each post-injection as a function of the activity state of the catalyst-forming means;

in that the analysis means for analyzing the activity state of the catalyst-forming means are connected to temperature sensors upstream and downstream from the catalyst-forming means in order to determine an operating point thereof and including determination means responsive to said operating point for determining the activity state of the catalyst-forming means; and in that the determination means for determining the activity state of the catalyst-forming means are adapted to compare the operating point of said means with two predetermined activity state transition curves defining ranges for an inactive state, an active state, and an activity-confirmed state of the catalyst-forming means and for confirming a state after a first predetermined period of time for confirming that the catalyst-forming means are in said state.

According to other characteristics:

various hysteresis differences are used depending on the direction of transitions from one state of the catalyst-forming means to another, in order to confirm the state;

the determination means are adapted to maintain information that the catalyst-forming means are in an inactive state during a second predetermined time period after the operating point of said means has crossed the corresponding inactive-to-active transition curve;

the time periods and the hysteresis differences are calibratable;

when the catalyst-forming means are in an activity-confirmed state, the common manifold means are adapted to inject a nominal quantity of fuel during the or each post-injection, when the catalyst-forming means are in an active state, the common manifold means are adapted to reduce the quantity of fuel injected during the or each post-injection by a multiplier factor, as a function of the difference between the operating point of said catalyst-forming means and the corresponding transition curve between an active state and an inactive state, and when the catalyst-forming means are in an inactive state, the common manifold means are adapted to limit the quantity of fuel injected during the or each post-injection to predetermined minimum value;

the minimum value is equal to 0;

the common manifold feed means are adapted to trigger a plurality of fuel post-injections, and the quantity of fuel injected during each post-injection while the catalyst-forming means are in an active state is regulated independently from the quantity of the other post-injection;

the engine is associated with a turbocharger;

the depollution means comprise a particle filter;

the depollution means comprise a NOx trap;

the fuel includes an additive for being deposited together with the particles with which it is mixed on the depollution means in order to facilitate regeneration thereof; and the fuel includes a NOx trap furring additive.

The invention can be better understood on reading the following description given purely by way of example and made with reference to the accompanying drawings, in which:

FIG. 1 shows a system for assisting the regeneration of depollution means integrated in an exhaust line of a motor vehicle.

Figure 1:
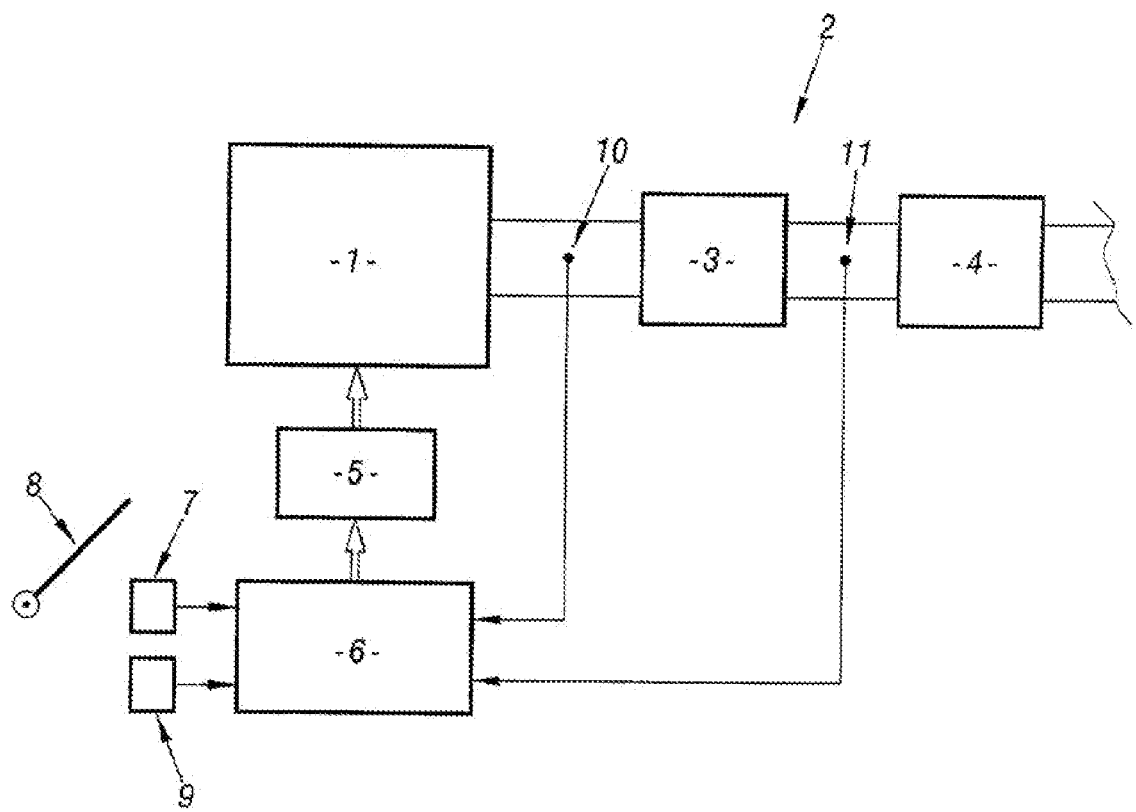
FIG. 1 is a block diagram showing the general structure of a system for assisting regeneration in accordance with the invention.

In this figure, the engine is given overall reference 1, the engine being a motor vehicle diesel engine and being associated with an exhaust line given overall reference 2, said exhaust line having integrated therein oxidation catalyst-forming means given overall reference 3, and depollution means given overall reference 4, e.g. comprising a particle filter.

By way of example, the oxidation catalyst-forming means are located upstream from the depollution means.

The engine is also associated with common manifold means for feeding fuel to its cylinders, these means being given overall reference 5 and being adapted to implement, at constant torque, a strategy of regeneration by injecting fuel into the cylinders of the engine, in at least one post-injection.

The operation of these means is controlled by a data processor unit given overall reference 6.

The data processor unit 6 is connected to means for detecting a stage in which the engine is idling or a stage in which the vehicle accelerator pedal is being raised. Thus, for example, the data processor unit is connected to a sensor 7 for detecting that the accelerator pedal 8 is being raised, and detector means 9 are also associated with the processor unit for the purpose of detecting that the vehicle engine is idling.

These means may have any suitable structure.

The data processor unit 6 is also connected to respective temperature sensors 10 and 11 placed upstream and downstream from the catalyst-forming means 3.

The data processor unit 6 is adapted to control the common manifold means 5 for feeding fuel in such a manner as to regulate the quantity of fuel that is injected during the or each post-injection, as a function of the activity state of the catalyst-forming means 3.

The unit then includes analysis means for analyzing the activity state of the catalyst-forming means and including the two temperature sensors 10 and 11 upstream and downstream therefrom enabling the unit 6 to determine the operating point of said catalyst-forming means and on the basis of said operating point, to determine the activity state of the catalyst-forming means.

Figure 2:
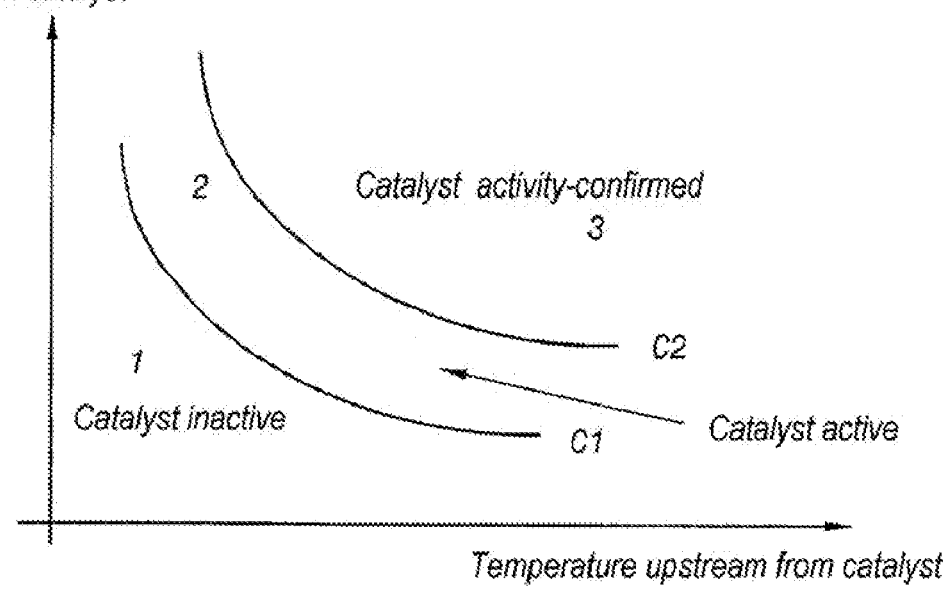
FIG. 2 is a graph showing curves used in a system of the invention for determining the activity state of the oxidation catalyst-forming means integrated in a system of the invention.

This determination is then performed by the data processor unit 6 making use of curves of the kind shown in FIG. 2.

For this purpose, these determination means are adapted to compare the operating point as previously determined from the temperatures measured upstream and downstream from the catalyst-forming means with two predetermined activity state transition curves C1 and C2 that define three activity state ranges of the catalyst-forming means: inactive 1; active 2; and activity-confirmed 3; and for validating a state at the end of a first predetermined time period for confirming that the catalyst-forming means are in said state.

The curve C1 is then a curve plotting the transition between a catalyst-inactive state and a catalyst-active state.

The curve C2 is then a curve plotting the transition between a catalyst-active state and a stage in which catalyst activity is confirmed.

When confirming the state, various hysteresis differences can be used depending on the directions of the transitions from one state to another of the catalyst-forming means.

In addition, the determination means formed by the unit 6 are adapted to maintain information representative of the catalyst-forming means being in the inactive state during a second predetermined period of time after the operating point thereof has crossed the corresponding transition curve C1 between inactive and active.

It should be observed that these periods of time and these hysteresis differences can themselves be calibratable, and they make it possible to ensure that the information relating to the state of the catalyst-forming means is reliable.

Figure 3:
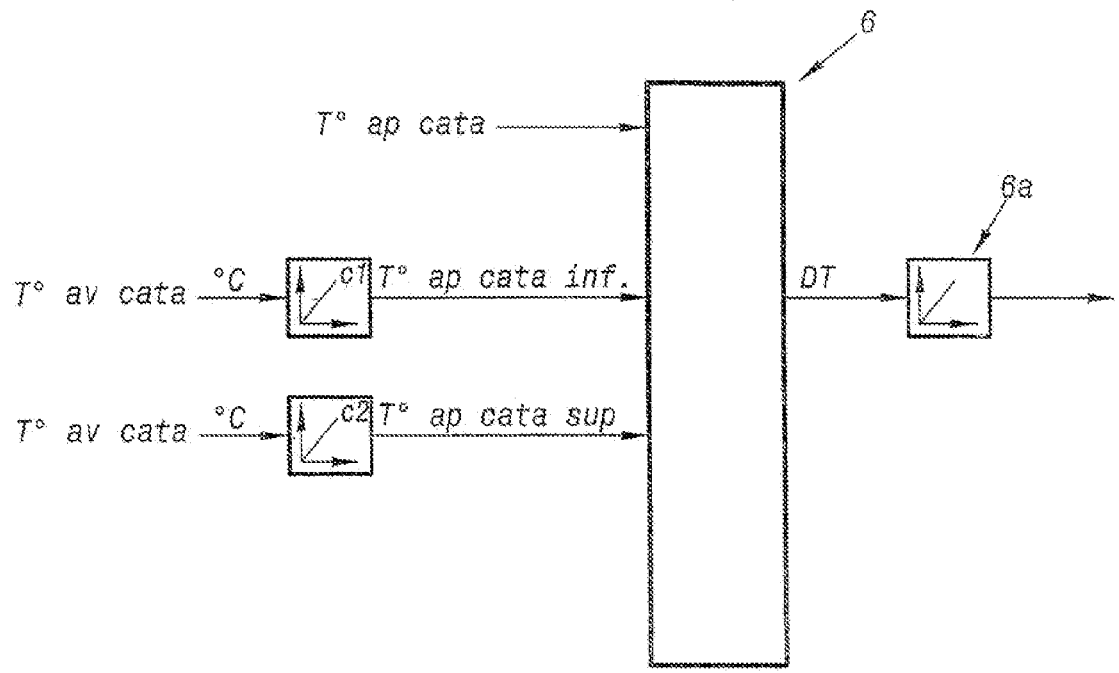
FIG. 3 shows an embodiment of regulation means involved in providing a system of the invention.

This is shown in FIG. 3 where there can be seen the data processor unit 6 receiving inputs delivering temperature information upstream and downstream from the catalyst-forming means and making use of the above-described transition curves C1 and C2. The unit 6 is then adapted to output signals for controlling the common manifold feed means 5 in order to regulate the quantity of fuel that is injected as a function of the activity state of the catalyst-forming means by acting through regulator means 6a, as described in greater detail below.

Figure 4:
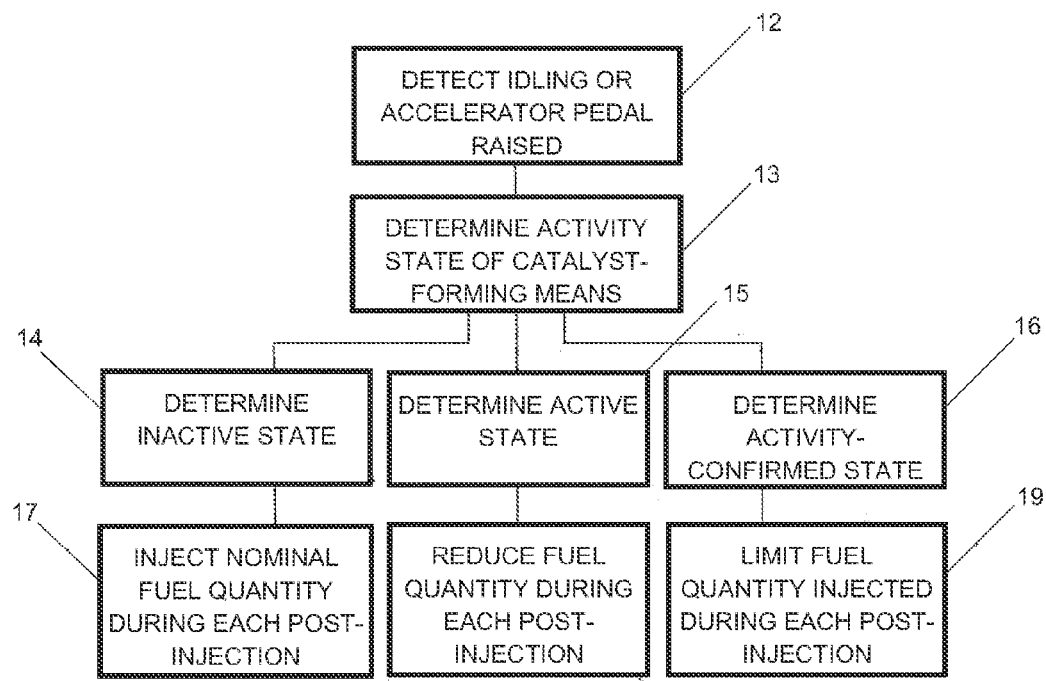
FIG. 4 illustrates the operation of said means.

Thus, and as shown in FIG. 4 for example, after detecting a stage in which the vehicle engine is idling or the accelerator pedal is being raised, given general reference 12, the data processor unit 6 is adapted to determine the activity state of the catalyst-forming means in a step 13, in the manner described above.

Depending on the information it acquires, the data processor unit then determines that the catalyst-forming means are in an inactive state 14, an active state 15, or an activity-confirmed state 16.

When the catalyst-forming means are in an activity-confirmed state, the common manifold means 5 are adapted to inject a nominal quantity of fuel during the or each post-injection in a step 17. In contrast, when the catalyst-forming means are in an active state, the common manifold means are adapted to reduce the quantity of fuel that is injected during the or each post-injection in a step 18 by a multiplier factor (lying in the range 0 to 1) that is a function of the difference between the operating point of said catalyst-forming means and the corresponding transition curve C1 between the active state and the inactive state. Finally, when the catalyst-forming means are in an inactive state, the common manifold means 5 are adapted in a step 19 to limit the quantity of fuel that is injected during the or each post-injection to a predetermined minimum value, which predetermined minimum value may be equal to 0, for example.

When the common manifold feed means are adapted to trigger a plurality of successive fuel post-injections in conventional manner, the quantity of fuel injected during each post-injection while the catalyst-forming means are in an active state is regulated independently of the quantity of the other post-injection.

Naturally, other dispositions may be provided.

Thus, for example, the engine may be associated with a turbocharger. The depollution means may comprise a particle filter, a NOx trap, etc.

Finally, conventional manner, the fuel may itself also include an additive for depositing together with the particles with which it is mixed on the depollution means in order to facilitate regeneration thereof by lowering the combustion temperature of the soot trapped therein.

In conventional manner, the additive is present in the particles after the additive-containing fuel has burnt in the engine.

It is also possible to envisage at additive constituting a NOx trap.

It will thus be understood that the purpose of the system is to determine whether the temperature levels of to catalyst-forming means are suitable for converting the unburnt hydrocarbons coming from the combustion chamber. The activity state of the catalyst-forming means serves to trigger transitions between different levels of regeneration assistance, i.e. between different levels of fuel post-injection. When the catalyst-forming means are not active, the or each post-injection of fuel is determined in such a manner that the quantity of unburnt hydrocarbons produced is very limited or zero. The temperature levels are nevertheless higher than in normal operation while regeneration is not taking place, thus allowing the catalyst-forming means to become active.

When the oxidation catalyst-forming means are active, the or each post-injection of fuel can produce HCs which are converted in the catalyst-forming means generating an exothermic reaction serving to raise the temperature levels at the inlets to the depollution means located downstream from said catalyst-forming means.

Thus, this function makes it possible to spend the shortest possible length of time in a state where the catalyst is not active, in order to ensure that the regeneration assistance is as effective as possible.

Three states of the catalyst-forming means can be defined:
an inactive catalyst state in which the temperature level of the catalyst-forming means is insufficient for converting the unburnt hydrocarbons coming from combustion of the post-injected fuel in the cylinder;
an active catalyst state in which said means convert the unburnt hydrocarbons coming from the combustion chamber; and
an activity-confirmed catalyst state in which the catalyst-forming means are active and present no risk of suddenly becoming inactive, in particular during stages in which the engine is idling or the accelerator pedal is being raised (when the only injection of fuel is post-injection, there being no pilot injection nor any main injection). This makes it possible to avoid the risk of emitting puffs of smoke from the exhaust.

The activity state of the catalyst is then determined from the temperatures measured in the exhaust line upstream and downstream from the catalyst-forming means. The transitions between states are obtained after a state-confirmation time, i.e. for a predetermined temperature upstream from the catalyst, the temperature downstream therefrom is found to be greater than the value determined by the corresponding transition curve for some calibratable minimum period of time. The time taken to leave a state is measured using another calibratable period of time. Such calibratable hysteresis is used to distinguish between rising fronts and falling fronts when changing state. Periods of forcing to a determined level serve to force the system prior to allowing the passage to the other level via the transition curve.

The objective of the system is to limit post-injection flow rate in the event of the engine idling and/or the accelerator pedal is being raised, whenever the catalyst-forming means are coming close to the inactivity limit.

By means of such a system, it is then possible to minimize peaks of HCs and the emission of smoke and odors while the engine is idling and/or the accelerator pedal is being raised.

This also serves to limit thermal aging of the catalyst-forming means by limiting exothermic temperature rise of the catalyst.

Naturally, other embodiments could be envisaged.

Thus, for example, the depollution means and the oxidation catalyst-forming means can be integrated in a single element, and particular on a common substrate.

By way of example, a particle filter could be envisaged that also includes the oxidation function.

Likewise, a single NOx trap including such an oxidation function could also be envisaged, whether or not the trap includes an additive. The oxidation function and/or the NOx trap could be filled, for example, by means of an additive mixed with the fuel.

The invention claimed is:

1. A system for assisting the regeneration of depollution means associated with oxidation catalyst-forming means integrated in an exhaust line of a motor vehicle diesel engine, and in which the engine is associated with common manifold means for feeding fuel to its cylinders, the system being adapted to implement, at constant torque, a strategy of regeneration by injecting fuel into the cylinders of the engine in at least one post-injection, wherein the system includes detection means for detecting at least one of a stage in which the vehicle engine is idling, a stage in which the accelerator pedal is being raised, and a stage in which the vehicle engine is idling and the accelerator pedal is being raised, and analysis means for analyzing the activity state of the catalyst-forming means in order to control the common fuel-feed manifold means in order to regulate the quantity of fuel injected during the or each post-injection as a function of the activity state of the catalyst-forming means;

wherein the analysis means for analyzing the activity state of the catalyst-forming means are connected to temperature sensors upstream and downstream from the catalyst-forming means in order to determine an operating point thereof and including determination means responsive to said operating point for determining the activity state of the catalyst-forming means; and wherein the determination means for determining the activity state of the catalyst-forming means are adapted to compare the operating point of said means with two predetermined activity state transition curves defining ranges for an inactive state, an active state, and an activity-confirmed state of the catalyst-forming means and for confirming a state after a first predetermined period of time for confirming that the catalyst-forming means are in said state, wherein, when the catalyst-forming means are in an activity-confirmed state, the common manifold means are adapted to inject a nominal quantity of fuel during the or each post-injection, when the catalyst-forming means are in an active state, the common manifold means are adapted to reduce the quantity of fuel injected during the or each post-injection by a multiplier factor, as a function of the difference between the operating point of said catalyst-forming means and the corresponding transition curve between an active state and an inactive state, and when the catalyst-forming means are in an inactive state, the common manifold means are adapted to limit the quantity of fuel injected during the or each post-injection to a predetermined minimum value.

2. A system according to claim 1, wherein various hysteresis differences are used depending on the direction of transitions from one state of the catalyst-forming means to another, in order to confirm the state.

3. A system according to claim 1, wherein the determination means are adapted to maintain information that the catalyst-forming means are in an inactive state during a second predetermined time period after the operating point of said means has crossed the corresponding inactive-to-active transition curve.

4. A system according to claim 2, wherein the time periods and the hysteresis differences are calibratable.

5. A system according to claim 1, wherein the minimum value is equal to 0.

6. A system according to claim 1, wherein the common manifold feed means are adapted to trigger a plurality of fuel post-injections, and wherein the quantity of fuel injected during each post-injection while the catalyst-forming means are in an active state is regulated independently from the quantity of the other post-injection.

7. A system according to claim 1, wherein the engine is associated with a turbocharger.

8. A system according to claim 1, wherein the depollution means comprise a particle filter.

9. A system according to claim 1, wherein the depollution means comprise a NOx trap.

10. A system according to claim 1, wherein the fuel includes an additive for being deposited together with the particles with which it is mixed on the depollution means in order to facilitate regeneration thereof.

11. A system according to claim 1, wherein the fuel includes a NOx trap forming additive.

* * * * *